A. M. HENRY.
CAMERA.
APPLICATION FILED JAN. 17, 1908.
923,173.
Patented June 1, 1909.
2 SHEETS—SHEET 2.
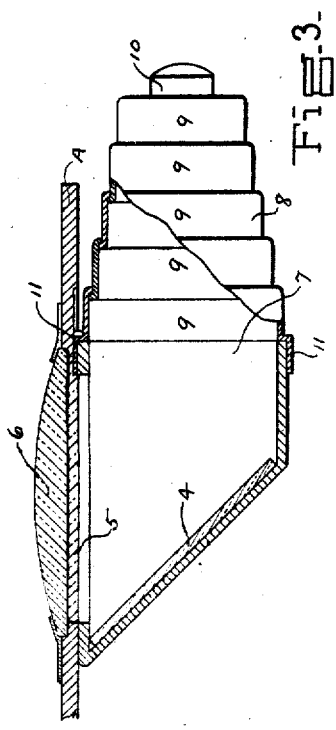
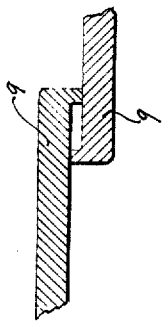
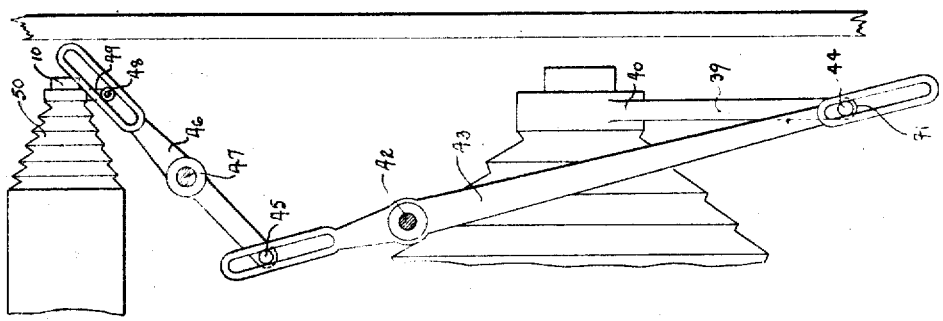

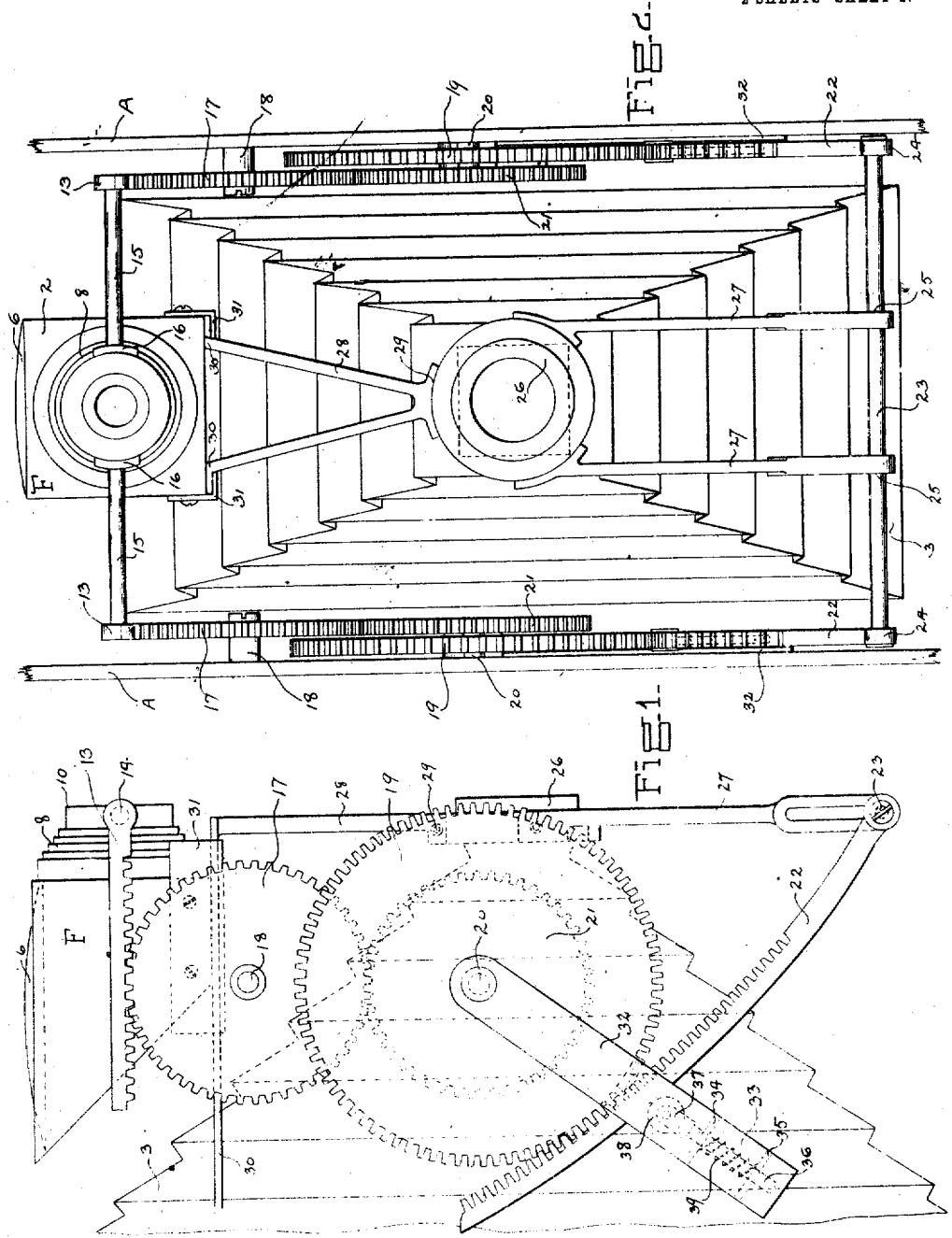

UNITED STATES PATENT OFFICE.

AUGUSTUS M. HENRY, OF NEW YORK, N. Y.

CAMERA.

No. 923,173.   Specification of Letters Patent.   Patented June 1, 1909.

Application filed January 17, 1908. Serial No. 411,223.

*To all whom it may concern:*

Be it known that I, AUGUSTUS M. HENRY, a citizen of the United States, and resident of New York, in the county of New York and State of New York, have invented certain new and useful Improvements in Cameras, of which the following is a specification.

This invention relates broadly to photographic apparatus, and more particularly to cameras of the focusing type. One of the objects thereof is to provide within cameras of this type an intermediate means whereby during the exposure the operator is enabled to observe in the view-finder a reproduction of the image then being received within the camera, and thereby learn whether said image is or is not in focus.

Many other objects will be in part obvious and in part pointed out hereinafter.

In the accompanying drawings, Figure 1 is a side elevation of a preferred embodiment of the invention, showing the mechanism in a closed condition. Fig. 2 is a front elevation of the same. Fig. 3 is a side view of the triangular-prismatic sight-box or finder, partly in cross-section. Fig. 4 is an enlarged view showing one method of connecting the plates which form the funnel of the said sight-box. Fig. 5 is a side elevation of another type of intermediate mechanism hereinafter mentioned.

Similar reference characters refer to similar parts throughout the several views of the drawings.

This invention aims merely to provide intermediate means adapted to create a continuous focal accord, under a series of actuations, between the camera proper and the "view-finder" or the like used in connection therewith. In order, however, to secure to the greatest extent the objects above set forth, it has been deemed desirable to embrace within the preferable embodiment of this invention, for the purposes of description, a special sight-box or view-finder F hereinafter described.

Referring now to the intermediate mechanism shown in Figs. 1 and 2, which is a preferable embodiment, there is shown a pair of horizontal racks 13 arranged longitudinally in parallel relation along the inner side walls of the camera casing A, their forward ends being fixedly attached as at 14 to the rigid shafts 15, which extend horizontally and at right angles therefrom. The opposite ends of said shafts 15 are fixedly attached to the sides of the lens-case as at 16. Engaging the teeth on the under side of each of the said racks 13 will be observed a pair of cog-wheels 17, arranged underneath the said racks 13 and suitably mounted as upon studs 18 within the respective side walls of the camera casing A. A second pair of cog-wheels 19 are suitably mounted as upon studs 20 and are adapted to engage cog-wheels 17 through the pinions 21. A pair of lower racks 22 are each provided with a varied curve, so that when engaging the cog-wheels 19 their normal position will be as shown in Figs. 1 and 2. Extending between the front ends of the racks 22 will be observed a connecting rod 23, each end of which is fixedly fastened as at 24. Intermediate the said rod 23 are two annular depressions 25 therein, the space between said depressions being coincident with the greatest diameter of the lens-case 26 thereabove. Fixedly attached to the lens-case 26 at opposite sides thereof are the upper ends of two parallel downwardly-extending rods 27, slotted in their lower ends as shown in the drawings and adapted to have such slots fit into the two annular depressions 25. Extending upwardly from lens-case 26 will be observed a substantially V-shaped member 28, fixedly attached thereto as at 29. To the upper ends thereof are suitably attached two backwardly-extending horizontal bars 30, adapted to rest in the parallel runways 31, attached to the under portion of the upper wall of the camera-casing A. In order to secure a continuous engagement between the lower racks 22 and the cog-wheels 19, there has been provided a pair of flanges 32, one extending substantially downward from each of the studs 20. To each of these flanges 32 is suitably attached a plate 33 having upturned ends 34 and 35, in the nature of parallel shelves. Arranged in these shelves is a rod 36, accommodating within a fork 37 at its upper end a roller 38. Rollers 38 are normally pressed against the smooth edges of the curved racks 22 in firm though slightly yieldable relation by means of the compression springs 39, coiled about the rods 36 between the shelves 34 and 35. A special sight-box F above referred to is shown in connection with this embodiment in Figs. 1 and 2, and also in Fig. 3 wherein the box-member 2 is seen in cross-section. It will be seen that the prime advantage thereof lies in its substantially triangular cross-section, as will be seen readily when the fact is noted that the downward slope formed by the upper periphery of the distended bellows 3 of the camera proper is substantially parallel with the line of obliquity of the under plane of the sight-box F. In other words, all that portion of an ordinary sight-box which usually exists behind the inclined mirror therein has been dispensed with in this embodiment of my invention as being, from the standpoint of compactness and utility, superfluous and objectionable. In consequence thereof, it will be seen that a sight-box of approximately double the reflective capacity of an ordinary sight-box, provided the former be of the special construction herein shown, may be accommodated within the identical space which formerly held the latter.

Within the oblique plane forming part of the triangular periphery of the body of the special sight-box is suitably fastened a mirror 4, within the upper or horizontal plane thereof a ground-glass 5, the same having superimposed thereover a magnifying-glass 6, and within the front vertical plane thereof a suitable aperture 7; all of which is well-known in the art. Other and novel elements thereof, however, are a collapsible light-tight funnel 8 preferably composed of overlapping plates 9 suitably connected as in Fig. 4, and a lens of adjustable focus suitably fixed within a lens-case 10 attached to the outer end of the said funnel 8. The plate at the larger end thereof is suitably attached to the box-member 2 of the special sight-box, as at 11, and so arranged that it will take about the aperture 7.

Although the above is the preferred and is believed to be the most successful embodiment of this invention, another means is shown in Fig. 6, which consists of the downwardly-extending parallel rods 39, (but one of said rods being seen in Fig. 6), suitably fastened to the lens-case 26 as at 40 and being connected at their lower ends by a rod 41. Mounted upon the pivot 42 will be observed a rock-lever 43, slotted at both its upper and lower ends to accommodate the pins 44 and 45 arranged respectively upon one of the rods 41 and upon the lower end of the rock-lever 46. Rock-lever 46 is pivotally mounted as at 47, having its upper end slotted to accommodate a pin 48, which is suitably fastened to the projection 49 extending from the lens-case 10 of the sight-box shown in said Fig. 6. A bellows 50 is here shown in place of the collapsible funnel disclosed in Figs. 1 and 2. A sight-box of conventional form is here shown, but it is obvious that a special sight-box of the nature hereinbefore described could also be utilized. It is clear that this lever arrangement will accomplish the result desired, and that the lens-case 10 will move forward simultaneously with the lens-case 26, thus forming the focal connection desired.

The operation of either of the embodiments of this invention herein described may now be understood. The camera having been opened and turned in the direction of the object to be photographed, the operator merely moves forward lens-case 26 until the image seen in the sight-box F is in focus and thereupon instantaneously actuates the shutter and makes the exposure. It will be seen that when once placed in agreeing focal accord, this relation will be permanent through the connected parts as shown, and that when the sight-box is in focus the camera proper must also be in focus.

In view of the fact that many changes could be made in the above construction and many apparently widely different embodiments of this invention could be made without departing from the scope thereof, I intend that all matter contained in the above description or shown in the accompanying drawings shall be interpreted as illustrative and not in a limiting sense.

I desire it also to be understood that the language used in the following claims is intended to cover all of the generic and specific features of the invention herein described and all statements of the scope of the invention which, as a matter of language, might be said to fall therebetween.

Having described my invention, what I claim as new, and desire to secure by Letters Patent, is:

1. In a camera or similar apparatus, in combination, a camera casing, a focusable photographic means therein, a focusable sight-box or finder permanently attached to said camera casing, and intermediate mechanism comprising a member rigidly attached to the lens-case of said photographic means, a rack attached thereto, a rack attached to the lens-case of said sight-box and intermediate gearing mechanism meshing with said racks and permanently attached to said camera casing whereby upon the opening of the camera casing said photographic means and said sight-box will be automatically maintained in operative connection for corresponding focusing according to the predetermined focal length of the lens and the arrangement of the mechanism.

2. A camera comprising a casing therefor, a focusable photgraphic means therein provided with a bellows and a lens-case containing a lens, a sight-box provided with a bellows and a lens-case containing a lens, said sight-box being rigidly attached to said camera-casing, a rack attached to said last-mentioned lens-case, a slide for the rack, a pinion meshing with the rack and attached to said camera casing, a second pinion meshing with the first pinion and attached fixedly for rotation to a gear mounted in said camera-casing, a rack attached to said first-mentioned lens-case, said rack meshing with said gear, and means for maintaining said gear and said last-mentioned rack in yieldably meshing relation, said gear and pinions being so disposed that when one lens is in focus the other is also in focus.

3. In combination, a camera casing, a sight-box therein having a focusing lens within a lens-case, a camera proper therein having a focusing lens within a lens-case, a rigid rack mounted upon said first-mentioned lens-case, a curved rack attached at one end to said second-mentioned lens-case, and intermediate gearing meshing with said racks adapted to maintain said finder and said camera in corresponding focal relations in varying stages of focus.

4. In a camera casing or similar apparatus, in combination with a focusable photographic means, an indicatory means provided with a focusable lens, and a system of connecting members; one end of said system being positively connected to said photographic means and the other end of said system being positively connected to said indicatory means; said photographic means, said indicatory means and said system of connecting members being adapted to normally be collapsed wholly within said camera casing and to be operated as one unit by the extension from said casing of the photographic means to vary the adjustment of the two lenses in connection with the movement of the lens-board, so as to preserve at all positions of the latter a correct relation between the position of the finder-lens and that of the objective.

5. In a camera casing or similar apparatus, in combination with a focusable photographic means, a sight-box or finder provided with a focusable lens, and a system of connecting members; one end of said system being positively connected to said photographic means and the other end of said system being positively connected to said sight-box; said photographic means, said sight-box and said system of connecting members being adapted to normally be collapsed wholly within said camera casing and to be operated as one unit by the extension from said casing of the photographic means to vary the adjustment of the two lenses in connection with the movement of the lens-board, so as to preserve at all positions of the latter a correct relation between the position of the finder-lens and that of the objective.

6. In a camera casing or similar apparatus, in combination with a focusable photographic means, a sight-box or finder provided with a focusable lens and having the form substantially of a hollow triangular prism, and a system of connecting members; one end of said system being positively connected to said photographic means and the other end of said system being positively connected to said sight-box; said photographic means, said sight-box and said system of connecting members being adapted to normally be collapsed wholly within said camera casing and to be operated as one unit by the extension from said casing of the photographic means to vary the adjustment of the two lenses in connection with the movement of the lens-board, so as to preserve at all positions of the latter a correct relation between the position of the finder-lens and that of the objective.

Signed at New York in the county of New York and State of New York this 15" day of January A. D. 1908.

AUGUSTUS M. HENRY.

Witnesses:
A. J. DORAN,
J. R. GREENMAN.